Patented May 28, 1929.

1,714,530

UNITED STATES PATENT OFFICE.

ADDIE TREMAIN AND HARRY D. TREMAIN, OF DALLAS, TEXAS.

PAINT AND VARNISH REMOVER.

No Drawing. Application filed December 6, 1926. Serial No. 153,045.

This invention relates to improvements in compositions of matter and has more particular reference to a composition for the removal of paint and varnish from wood or metallic surfaces.

The primary object of the composition is to provide a varnish and paint compound especially adaptable to removing paint and varnish from motor vehicles. The compound, however, is equally efficacious in the removal of paint and varnish from furniture or other objects.

The compound or composition of matter may be manufactured at a nominal cost and is presented to the trade in powdered form and by the addition of water is ready for instant use and application.

With the above objects in view, the invention consists of the mixture together of sodium hydroxide, hydrated calcium, fuller's earth, tri-sodium phosphate, red manganese oxide, powdered starch, methyl-salicylate.

These ingredients are compounded and mixed together in about the following proportions to produce one hundred pounds of the compound in powdered form:

| | |
|---|---|
| Sodium hydroxide | 35 lbs. |
| Hydrated calcium | 40 lbs. |
| Fuller's earth | 5 lbs. |
| Tri-sodium phosphate | 5 lbs. |
| Red manganese oxide | 10 lbs. |
| Powdered starch | 5 lbs. |
| Methyl-salicylate | 1 dram. |

The above ingredients are thoroughly mixed together and when the compound is to be applied, and as an illustration and example of its application, one quart of the powder or composition is added to two quarts of water. Immediately on the addition of the water to the powder, the contents are stirred briskly until a smooth, even mixture is obtained. Then additional water is added until the fluid has the consistency of a rich cream.

The fluid or composition may now be applied to the material or surface from which the paint or varnish is to be removed. For this purpose preferably a fibre brush is employed and the composition or fluid is permitted to remain on the surface from fifteen to twenty minutes, or as long as may be required to soften all of the paint or varnish. When the paint or varnish is sufficiently soft, the composition is then flushed off with a stream of water.

The sodium hydroxide has an immediate softening effect on the paint or varnish and the hydrated calcium, combined with the fuller's earth has a neutralizing effect on the acids and prevents any reaction on the metal. The tri-sodium phosphate acts to start the solution working quickly, while the red manganese oxide acts as a neutralizer to prevent injury to the operator's hands or body. The various ingredients are held together in the compound as an adhesive mass by the addition of the starch, and also to cause the composition to adhere sufficiently to the surface to which applied. In order to offset and neutralize any offensive odor emanating from the compound, the methyl-salicylate is added.

The composition will remove paint and varnish from metal or wood, and if the surface is thoroughly washed afterwards it will not be necessary to use any other ingredient, such as gasoline or vinegar, to prevent the paint from slipping.

What is claimed is:

A dry powder paint and varnish remover formed by mixing together sodium hydroxide 35 lbs., hydrated calcium 40 lbs., fuller's earth 5 lbs., tri-sodium phosphate 5 lbs., red manganese oxide 10 lbs., powdered starch 5 lbs., and methyl-salicylate 1 dram.

In testimony whereof we affix our signatures.

Mrs. ADDIE TREMAIN.
HARRY D. TREMAIN.